Aug. 1, 1950 H. K. BAKER 2,516,842
APPARATUS FOR FEEDING CUTTING TOOLS
Filed Sept. 9, 1944 4 Sheets-Sheet 3

INVENTOR
Herbert K. Baker

Aug. 1, 1950　　　　　H. K. BAKER　　　　　2,516,842
APPARATUS FOR FEEDING CUTTING TOOLS
Filed Sept. 9, 1944　　　　　　　　　　　4 Sheets-Sheet 4

INVENTOR
*Herbert K. Baker*

Patented Aug. 1, 1950

2,516,842

UNITED STATES PATENT OFFICE 2,516,842

APPARATUS FOR FEEDING CUTTING TOOLS

Herbert K. Baker, Detroit, Mich.

Application September 9, 1944, Serial No. 553,432

9 Claims. (Cl. 74—58)

This invention relates to apparatus for imparting travel motion to machine carriages, slides or spindle quills for co-operative feeding action with cutting tools and it has particular reference to mechanism for actuating, in sequence, change in the speed of travel and reversing motion.

Among the more important objects of the invention are, the simplification of apparatus with respect to construction and maintenance; smoothness of action to enhance operating efficiency; accessibility of the pertinent mechanism for adjustment and changes to vary lengths of travel motion and rates of feed in steps of extremely fine degree.

How the foregoing objects and advantages, together with others which will occur to those skilled in the art, are obtained will be clear from the following description with accompanying drawings which illustrate the preferred embodiment of the apparatus, and in which—

Figure 4:
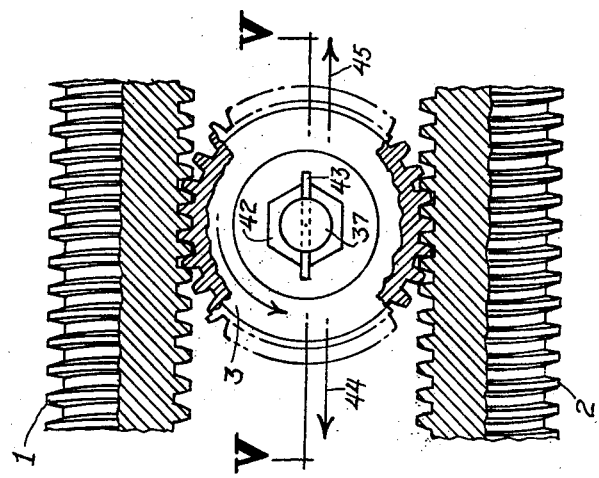
Figure 4 is an enlarged view of a portion of the apparatus.
Figure 5:
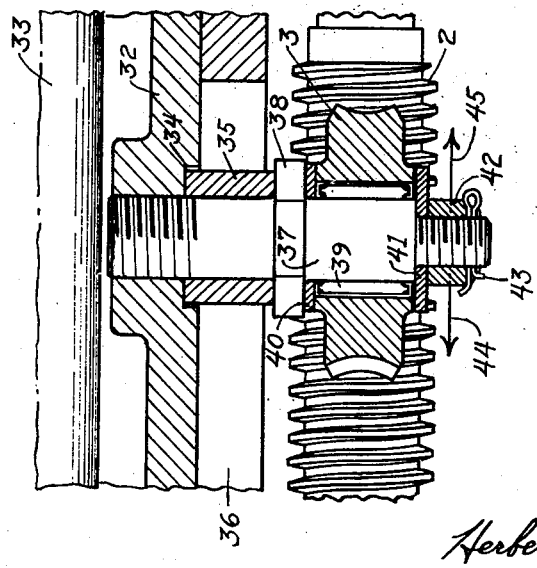
Figure 5 is a sectional view taken as indicated by line V—V of Figure 4.

Referring now to the drawings, the reference numerals 1 and 2 indicate each of a pair of worms with extended shafts, having the same hand and lead of thread, which are spaced apart and arranged for revolving in opposite directions. Positioned between these worms and in mesh therewith is worm gear 3, arranged for rotating and reciprocating motion, being mounted on stud 37 with needle bearing 39 (Figures 4 and 5). This stud is threaded in and secured to spindle slide or quill 32 whereby reciprocating motion of the worm gear is transmitted to the spindle quill.

The reciprocating motion is effected by a worm revolving, causing rotation of the worm gear, while the other worm remains stationary or is revolved at a slower speed, thus in response to this differential motion the rotating worm gear is caused to move in a direction lengthwise of the worms in mesh therewith at a rate of travel in ratio to the difference in the speed of these worms. The revolving of worm 1 while worm 2 is held stationary or rotated at a lower speed causes worm gear 3 to travel in the direction indicated by arrow 44 (Figure 4). When worm 1 is held stationary while worm 2 is rotated, worm gear 3 is caused to travel in the direction of arrow 45.

Figure 1:
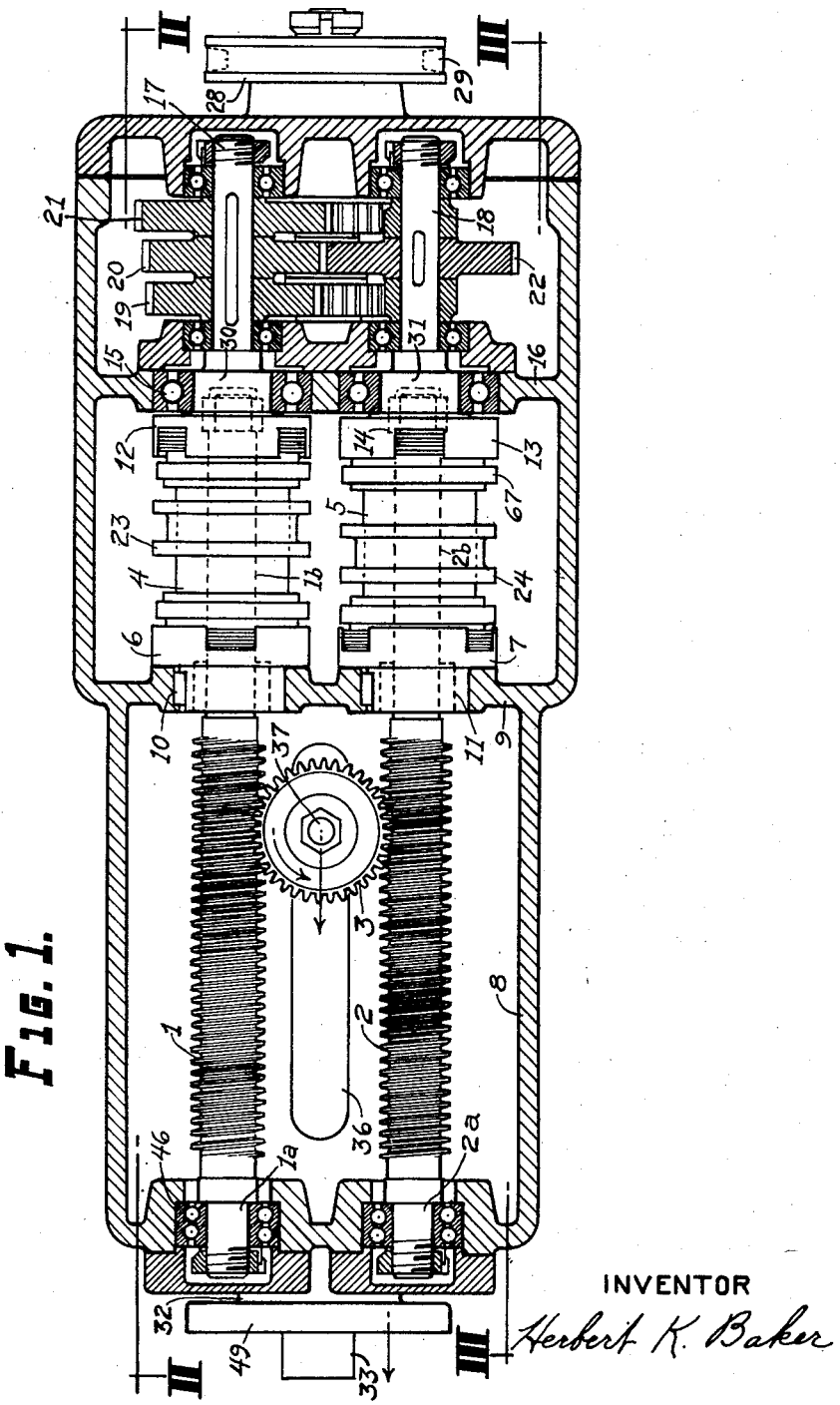
Figure 1 is a view taken from the bottom of the apparatus with the lower portion of the housing broken away.

As clearly shown in Figure 1, adjacent ends of the two shafts 1a and 2a of the worms are journalled in housing 8 with ball bearing 46 and so mounted to resist longitudinal thrust in both directions. The drive of worms 1 and 2 is arranged thru clutch bodies 4 and 5 respectively mounted on and keyed to shafts 1b and 2b of the worms. At one end of these clutch bodies for co-operative action therewith are driving clutch cups 12 and 13 respectively in which the ends of the shafts 1b and 2b are journaled with needle bearing 14. These clutch cups have hubs 30 and 31 respectively and are journalled with ball bearing 15 in intermediate rib 16 of housing 8.

Extending from hub 30 of clutch cup 12 and integral therewith is shaft 17 on which gears, 19, 20 and 21 are mounted and keyed thereto. On shaft 18 of clutch cup 13 gear 22 is mounted and keyed. Gear 22 is driven by and in mesh with gear 20, thus a differential pitch diameter of one in respect to the other of this pair of gears regulates the speed relation of the two worms when caused to revolve. For further co-operative action with the clutch bodies and opposite the driving clutch cups 12 and 13, stationary clutch cups 6 and 7 respectively are mounted and secured into the intermediate rib 9 of housing 8 and provided with key 10 interlocking with this intermediate rib to resist rotation. The shafts 1b and 2b of the worms extend thru these stationary clutch cups and journalled with needle bearing 11. Slidably mounted on the clutch bodies 4 and 5 are shipper sleeves 23 and 24 respectively for co-operative and selective engagement or disengagement with either the driving clutch cups or stationary driving clutch cups to in turn revolve or hold stationary the shafts of the worms on which these clutch bodies are mounted and keyed thereto.

As clearly shown in Figure 5, for the mounting and securing of stud 37 to spindle quill 32, a collar 35 is provided thru which one end of this stud extends and is threaded into the spindle quill. Hexagon shoulder 38 of the stud is drawn down tight against one end of this collar with its other end bearing against recess 34 of the spindle quill. This collar rides in slot 36 of the housing for longitudinal travel of the spindle quill with the worm gear. A spacing washer 40 is positioned on the stud against hexagon shoulder 38 for worm gear 3 to ride in proper alignment with the worms in mesh therewith. Retaining washer 41 holds the worm gear on the stud to resist thrust, and is secured in place against a shoulder of the stud by nut 42 which is locked by cotter pin 43.

With respect to the drive of the several shafts, a pulley 28 is mounted and keyed to shaft 27 for engagement with belt 29 extending to a power source (not shown) such as an electric motor. Gear 25, mounted and keyed to shaft 27, drives gear 21 which is mounted and keyed on shaft 17 for rotating gears 19 and 20 mounted and keyed on this shaft also. Gear 19 drives gear 26 which is arranged for driving spindle 33 mounted in spindle quill 32. See Figures 1, 2 and 3.

Spindle 33 extends out from the spindle quill 32 and has a bored socket 47 with keyway 48 (Figure 3) for receiving the shank, of a cutting tool, a tool holder or a multiple spindle drill head (not shown).

The spindle quill 32 in its advancement toward work to be performed is required to first move at a comparatively fast rate of travel, commonly known in the art as "Rapid advance." Then during the performance of the work moves at a slower rate, in conformity with the cutting efficiency of the tool, called "Feed." Upon completion of the work, the spindle quill is caused to reverse its travel direction to its starting position, known as "Rapid return."

This "Rapid advance," "Feed" and "Rapid return" are sequence phases of a reciprocating cycle. In the actuation of the mechanism embodied in this invention to obtain, "Rapid advance" of the spindle quill, first, the worm 1 is caused to revolve, thus driving worm gear 3, while worm 2 is held stationary which forces this rotating worm gear to move in a direction indicated by arrow 44 at a comparatively fast rate to compensate for the difference as to speed of worm 1 relative to the negative operation of worm 2. For "Feed," at a predetermined point of travel of the spindle quill, worm 2 is caused to revolve also but at a somewhat slower speed than worm 1, as determined by the relative pitch diameters of gears 20 and 22, thus changing the rate of travel of this spindle quill in ratio to the difference in relative speed of the two worms. Upon completion of the "Feed" phase, worm 1 is caused to stop and held stationary while worm 2 continues to revolve which reverses the direction of travel motion of the worm gear (indicated by arrow 45, Figures 4 and 5) until the spindle quill reaches starting position thereupon worm 2 is also caused to stop revolving thereby holding worm gear 3 and consequently spindle quill 32 stationary until again repeating a reciprocating cycle.

To start the spindle quill travel at "Rapid advance" a double solenoid 50 (Figure 2) is provided and a push button switch (not shown) may be operated and thru wire 54 energize coil 50a of this solenoid, thus shifting forked lever 52 to engage shipper sleeve 23 of clutch body 4 with driving clutch cup 12 causing worm 1 to revolve.

A rod 61, secured to flange 49 of spindle quill 32 and movable therewith carries dog 55 adjustable as to position on this rod and held secure by set screw 63.

The rate of travel to "Feed" from "Rapid advance" is changed at a predetermined point of travel of the spindle quill by dog 55 tripping switch 56 (Figure 3) and thru wire 66 energizes coil 51b of double solenoid 51, thereby actuating forked lever 53 for disengagement of shipper sleeve 24 of clutch body 5 from stationary clutch cup 7 to engagement with driving clutch cup 13 to revolve worm 2 for cooperation with the revolving worm 1.

Figure 2:
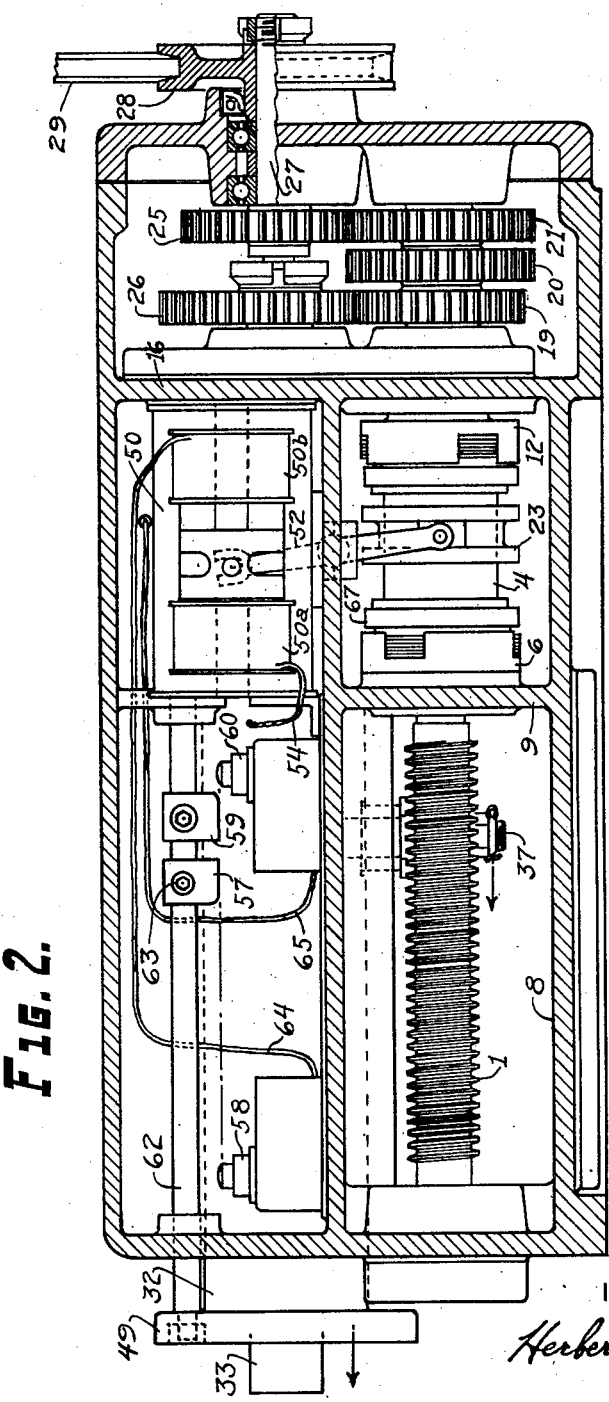
Figure 2 is a sectional view of the apparatus as indicated by line II—II of Figure 1.
Figure 3:
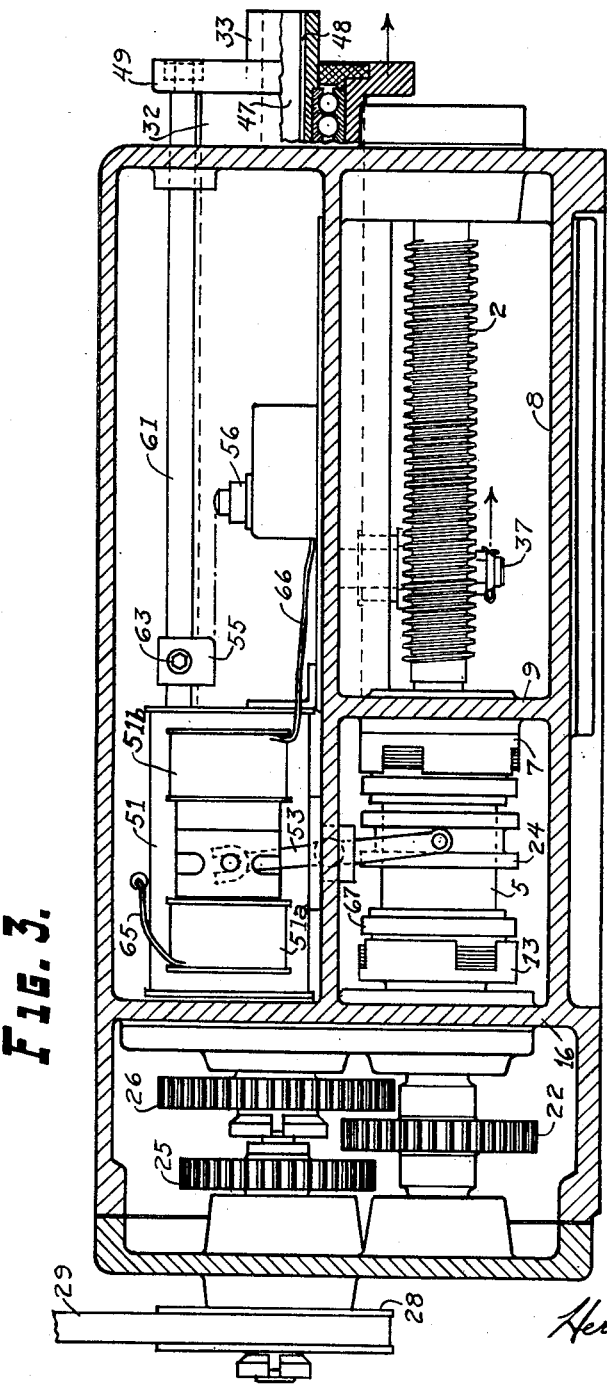
Figure 3 is a sectional view of the apparatus as indicated by line III—III of Figure 1.

As shown in Figure 2, a rod 62 is secured to flange 49 of spindle quill 32 and on this rod, adjustably mounted are dogs 57 and 59 which are held to position by set screw 63.

For reversing the travel of the spindle quill to "Rapid return," dog 57 trips switch 58 and thru wire 64 energizes coil 50b of double solenoid 50 for actuating forked lever 52 to disengage shipper sleeve 23 of clutch body 4 from driving clutch cup 12 for engagement with stationary clutch cup 6 to stop revolving and hold stationary worm 1 while worm 2 continues to revolve.

Upon reaching the end of the "Rapid return" travel of the spindle quill, dog 59 trips switch 60 and thru wire 65 energizes coil 51a of double solenoid 51 thereby actuating the forked lever 53 to shift shipper sleeve 24 of clutch body 5 from driving clutch cup 13 to engagement with stationary clutch cup 7 to stop revolving and hold stationary worm 2. At this point both worms are held stationary and the spindle quill unoperative until again actuating the mechanism to repeat a reciprocating cycle.

The clutch assemblies employed in the structure disclosed herein are preferably of the multiple disc type with an adjusting ring 67 for regulating pressure against the discs during engagement. In this manner, means are provided for adjusting the pressure of engagement to such an extent that when a specific torque load is exceeded, thru overload as might occur by breakage of a cutting tool, the clutches will then slip and the mechanism advancing the cutting tool be retarded or stopped, thus preventing serious damage to the apparatus.

Adjustment to a predetermined length of travel of any sequence phase "Rapid advance," "Feed" and "Rapid return" of a reciprocating cycle is accomplished by merely loosening set screw 63 of the pertinent dog causing actuation of the mechanism for the particular sequence phase of the reciprocating cycle to be changed and moving this dog on its supporting rod to position relative to the length of travel desired and secure thereto by tightening the set screw.

During all phases of an entire reciprocating cycle, the worm gear 3 continuously rotates in the same direction, whether driven by one or the other or both worms simultaneously. This action provides a uniformity of wear to these cooperating members for prolonging their life and smooth operation with neglible amount of shock to the apparatus during actuation of the mechanism for changing the rate of travel or reversing direction of travel of the spindle quill.

Various "Feed" rates of travel of the spindle quill 32 are obtained by merely replacing the mating gears 20 and 22 on shafts 17 and 18 respectively with another pair of gears of a different pitch diameter relation corresponding to the desired change in "Feed" rate. This arrangement affords a very fine adjustment, in steps, by tooth progression (less in one gear and more in the other), as a single tooth change in differential of each gear only alters minutely the "Feed" rate of travel due to the longitudinal travel of the worm gear being at a rate resulting from the lead of the worm thread multiplied by only half the difference between the revolving speeds of the two worms.

In comparison of my improved structure as disclosed herein with another, heretofore, employing for instance the well known feeding arrangement of a lead screw and nut, this prior arrangement does not provide as fine a feed adjustment because of the rate of this longitudinal travel must necessarily result from the lead of the thread as multiplied by the total difference between the revolving speeds of the lead screw and nut, therefore, the steps of feed adjustment necessarily had to be twice as coarse as provided by the present invention.

Other prior feeding mechanisms employed cams of various types, configured or grooved in relation to the varied sequence rates of travel and reversing motion desired for the specific cutting tool employed. However, these cam actuated mechanisms required that a new cam be made for every desired change in "Feed" rate or length of travel, and further, a large portion of the apparatus had to be disassembled and reassembled for the replacement of these cams.

Still other prior feeding arrangements employed hydraulic means for imparting reciprocating movement to the cutting tools. Although fine feeds are obtainable hydraulically, considerable space is required for installation of the necessary pump, valves, fluid reservoir and controls which is objectionable where compactness is desired. Furthermore in many instances when starting up the hydraulic system, the fluid being comparatively cold, the feed rate will change as the viscosity of the fluid changes with the heat generated from the pressures involved thru usage. Besides hydraulic systems are sensitive to foreign matter or sludge collecting in the fluid medium over a period of time, therefore these hydraulic systems usually require frequent servicing to maintain consistent "Feed" rates.

From the foregoing it will be apparent the present invention provides improved means for obtaining extremely fine rates of "Feed" to meet the most exacting requirements of metal cutting tools in respect to accuracy and finish in the work performed. Finally, other advantages, as will be observed from this specification, flow from the structure disclosed herein by the use of parts which have maximum strength and life, assembly in a compact arrangement to conserve space and to further provide smoothness of operation with ease of maintenance and adjustment.

What I claim is:

1. In combination, a spindle quill arranged for travel motion adapted to the feed of a cutting tool, two worms spaced apart in parallel relation, a worm gear operative between the worms and in mesh therewith, a stud secured to the spindle quill for mounting the worm gear in cooperative association with the worms, a spindle rotatably mounted in the spindle quill for rotating a cutting tool, a pair of gears meshed together for revolving the worms at a relative speed of one greater than the other and means for driving said pair of gears and said spindle simultaneously.

2. In combination, a spindle quill arranged for travel motion adapted to the feed of a cutting tool, a spindle rotatably mounted in the spindle quill for rotating a cutting tool, two worms spaced apart in parallel relation, a stud secured to the spindle quill, a worm gear rotatably mounted on the stud between the worms and in mesh therewith, a pair of shafts drivingly connected to said worms, a pair of gears meshed together on said shafts for revolving the worms at a relative speed of one greater than the other, an additional pair of gears drivingly connected to the spindle for rotating the spindle, and driving mechanism drivingly connected to one of said shafts, one gear of each of the said successive pairs of gears being mounted on one of said shafts.

3. In combination, a frame, two worms journalled in spaced parallel relation in said frame, a worm gear positioned between the worms and in mesh therewith, said worms having shafts extending from each end of the worm thread, stationary brake cups fixedly secured to said frame, one end of the shafts being journalled in bearings mounted in said frame to resist lengthwise thrust of the worms in both directions, and the other end of the shafts journalled in said stationary brake cups, clutch mechanism mounted for cooperative association with said stationary brake cups, and driving clutch cups selectively engageable with said clutch mechanism for revolving the worms.

4. In combination, a frame, a tool-holding slide, means for mounting and guiding said slide for reciprocation relatively to said frame, a pair of worms rotatably mounted in parallel spaced relationship in said frame, a support connected to said slide, a worm gear rotatably mounted on said support and disposed between said worms in meshing engagement therewith, a pair of worm driving shafts, mechanism drivingly interconnecting said driving shafts for rotation in opposite directions, a tool-holding spindle rotatably mounted on said slide, means for rotating said spindle, and clutch devices including a pair of stationary brake elements secured to said frame, said clutch devices also including means for connecting each of said worms selectively to its respective driving shaft or to its respective stationary element whereby to selectively hold either of said worms stationary while rotating the other or to rotate both of said worms simultaneously so as to provide rapid travel or feeding travel of said tool-holding slide.

5. In combination, a frame, a tool-holding slide, means for mounting and guiding said slide for reciprocation relatively to said frame, a pair of worms rotatably mounted in parallel spaced relationship in said frame, a support connected to said slide, a worm gear rotatably mounted on said support and disposed between said worms in meshing engagement therewith, a pair of worm driving shafts, mechanism drivingly interconnecting said driving shafts for rotation in opposite directions at different relative speeds, a tool-holding spindle rotatably mounted on said slide and drivingly connected to one of said worm driving shafts, and clutch devices including a pair of stationary brake elements secured to said frame, said clutch devices also including means for connecting each of said worms selectively to its respective driving shaft or to its respective stationary element whereby to selectively hold either of said worms stationary while rotating the other or to rotate both of said worms simultaneously at different relative speeds so as to provide rapid travel or feeding travel of said tool-holding slide.

6. In combination, a frame, a tool-holding slide, means for mounting and guiding said slide for reciprocation relatively to said frame, a pair of worms rotatably mounted in parallel spaced relationship in said frame, a support connected to said slide, a worm gear rotatably mounted on said support and disposed between said worms in meshing engagement therewith, a pair of worm driving shafts, mechanism drivingly interconnecting said driving shafts for rotation in opposite directions, clutch devices including a pair of stationary brake elements secured to said frame and a pair of rotatable clutch elements drivingly secured to said worms, said clutch devices also including axially shiftable clutch bodies drivingly connected to said worm driving shafts and connecting each of said worms selectively to its respective driving shaft or to its respective stationary element whereby to selectively hold either of said worms stationary while rotating the other or to rotate both of said worms simultaneously so as to provide rapid travel or feeding travel of said tool-holding slide, magnetically-operated clutch shifters operatively connected to said clutch bodies for shifting the same, and mechanism responsive to predetermined travel of said slide for energizing said clutch shifters.

7. In combination, a spindle carrier arranged for travel motion adapted to the feed of a cutting tool, two worms spaced apart in parallel relationship, a worm gear shaft connected to said spindle carrier to travel therewith, a worm gear mounted on said worm gear shaft to operate between the worms and in mesh therewith for imparting travel motion to the spindle carrier, a spindle rotatably mounted on said spindle carrier for rotating a cutting tool, a pair of gears meshed together for revolving the worms at a relative speed of one greater than the other, and mechanism for driving said pair of gears and said spindle simultaneously.

8. In combination, a spindle carrier arranged for travel motion adapted to the feed of a cutting tool, two worms spaced apart in parallel relationship, a worm gear shaft connected to said spindle carrier to travel therewith, a worm gear mounted on said worm gear shaft to operate between the worms and in mesh therewith for imparting travel motion to the spindle carrier, a spindle rotatably mounted on said spindle carrier for rotating a cutting tool, a pair of gears meshed together for revolving the worms at a relative speed of one greater than the other, and mechanism for driving said pair of gears and said spindle simultaneously, and a braking device selectively engageable with one of said worms to halt the same whereby to halt one of said worms so as to impart a relatively faster speed to the spindle carrier than the speed imparted thereto by the simultaneous revolving of both worms.

9. In combination, a spindle carrier arranged for travel motion adapted to the feed of a cutting tool, two worms spaced apart in parallel relationship, a worm gear shaft connected to said spindle carrier to travel therewith, a worm gear mounted on said worm gear shaft to operate between the worms and in mesh therewith for imparting travel motion to the spindle carrier, a spindle rotatably mounted on said spindle carrier for rotating a cutting tool, a pair of gears meshed together for revolving the worms at a relative speed of one greater than the other, and mechanism for driving said pair of gears and said spindle simultaneously, and a braking device selectively engageable with each of said worms to halt the same whereby to halt either one of said worms so as to impart a relatively faster speed to the spindle carrier than the speed imparted thereto by the simultaneous revolutions of both worms.

HERBERT K. BAKER.

REFERENCES CITED

The following references are of record in the file of this patent:

UNITED STATES PATENTS

| Number | Name | Date |
|---|---|---|
| 487,775 | Richards | Dec. 13, 1892 |
| 750,370 | Kammerer | Jan. 26, 1904 |
| 863,966 | Billeter | Aug. 20, 1907 |
| 1,665,227 | Smith | Apr. 10, 1928 |
| 2,299,635 | MacNeil et al. | Oct. 20, 1942 |

FOREIGN PATENTS

| Number | Country | Date |
|---|---|---|
| 6,581 | Great Britain | of 1911 |
| 490,684 | Germany | Jan. 31, 1930 |